United States Patent [19]

Rasmussen

[11] 3,886,979
[45] June 3, 1975

[54] SHIRRED TUBULAR FOOD CASINGS HAVING A BARRIER COATING

[75] Inventor: Jerome J. M. Rasmussen, South Stickney Twp., Marinette County, Ill.

[73] Assignee: Union Carbide Corporation, New York, N.Y.

[22] Filed: Aug. 1, 1972

[21] Appl. No.: 276,919

[52] U.S. Cl. .............. 138/118.1; 426/125; 426/135
[51] Int. Cl. ............................................. A22c 13/00
[58] Field of Search ........... 426/105, 125, 420, 135, 426/138, 140; 161/176, 178; 17/42, 49, 51; 117/66, 95.7; 264/183; 138/118.1

[56] References Cited
UNITED STATES PATENTS

| | | | |
|---|---|---|---|
| 2,201,457 | 5/1940 | Smith et al...................... | 426/420 X |
| 3,322,553 | 5/1967 | Seifried et al.......................... | 117/7 |
| 3,451,827 | 6/1969 | Bridgeford.......................... | 426/420 |

FOREIGN PATENTS OR APPLICATIONS

| | | | |
|---|---|---|---|
| 1,292,581 | 11/1974 | United Kingdom.............. | 138/118.1 |

*Primary Examiner*—Richard C. Queisser
*Assistant Examiner*—Daniel M. Yasich
*Attorney, Agent, or Firm*—F. Schoenberg

[57] ABSTRACT

A shirred and compressed tubular food casing, including a casing having a fibrous web embedded in the wall thereof, having a continuous barrier coating adhered to the surface thereof. A method for preparing said shirred casing comprises shirring a barrier coated tubular casing, said tubular casing having a moisture content of at least 10% by weight and said barrier coating exhibiting extensibility characteristics of at least about 4% at 32°F.

6 Claims, No Drawings

SHIRRED TUBULAR FOOD CASINGS HAVING A BARRIER COATING

This invention relates to tubular food casings and more particularly to shirred tubular food casings having a continuous barrier coating adhered to a surface thereof.

There are a large numer of different types of processed food products such as frankfurters, bologna, salami, liverwurst, cheese rolls, turkey rolls, and the like manufactured throughout the world from a wide range of recipes and using many different types of processing conditions. A common feature of most categories of processed food products, particularly meat products, is that the mixture of ingredients of which the processed food product is prepared, commonly called an "emulsion," is stuffed into a casing. The food product is processed while encased in the casing, and in many cases is then stored in the casing.

Casings most generally used are synthetic casings that may be of several different types and sizes depending on the category of food product to be prepared. In general, synthetic casings are supported or unsupported materials with the supported type, commonly called "fibrous food casing," utilized in the preparation of larger sizes of products such as bologna or turkey rolls. Fibrous casing consists of a fibrous web, usually a nonwoven paper, formed into a seamless tube, impregnated with viscose which is regenerated in situ.

Since there are so many differences in recipes for making processed food products, such as sausages, and such different modes of processing the different products, it is difficult to provide a casing that is acceptable for all uses. For example, a category of sausages is typified by liver sausage which is moist, relatively soft, has a substantially high fat content and is cooked, usually in hot water or steam, by the manufacturer. In this type of sausage, moisture must be retained within the emulsion and the emulsion must be protected against oxidation which causes undesirable discoloration. A suitable casing should therefore be impermeable to moisture and have a low rate of oxygen transmission and various casings having a barrier coating adhered to the surface thereof are commercially available for use in such applications. Food casings such as, for example, disclosed in U.S. Pat. No. 2,961,323, are coated with materials such as a polyvinylidine chloride copolymer which coating is substantially impermeable to moisture and has low oxygen and gas transmission characteristics.

Large diameter flexible synthetic tubular casings are, in general, supplied to the food processor in a flattened condition, cut to predetermined lengths. Smaller diameter casings usually supplied in long lengths, such as for example, 55 feet to 160 feet or more, are generally shirred and compressed to produce what is commonly termed in the art "shirred casing sticks" of from about 9 inches to 24 inches in length. The convenience in handling made possible by shirring long lengths of tubular casing makes it desirable to employ this method for as many types and sizes of tubular casing as possible. It has been found, however, that casings which are prepared with a barrier coating adhered to the surface thereof cannot be mechanically shirred because the tubular casing and/or the barrier coating are damaged during shirring.

In accordance with the present invention there is provided a novel shirred and compressed tubular casing having a continuous barrier coating adhered to a surface thereof. The shirred casing, including a tubular casing having a fibrous web embedded in the wall thereof, may be prepared on conventional shirring apparatus without damage to either the tubular casing or the barrier coating adhered thereto and the shirred and compressed casing may be stuffed using conventional food stuffing equipment without damage thereto.

The present invention is based on the surprising discovery that a barrier coated tubular casing may be readily shirred on conventional shirring apparatus if the moisture content of the tubular casing is at least about 10% by weight and preferably between 14 and 28% by weight and the barrier coating exhibits extensibility properties at 32°F. of at least about 4%. It is essential to the preparation of the shirred and compressed tubular food casing of the present invention that the barrier coated tubular food casing to be shirred exhibit both the moisture content and coating extensibility characteristics herein described.

Coating extensibility as employed throughout this specification and in the claims appended hereto is defined as the percentage of circumferential stretching which the casing will undergo at 32°F. before the barrier coating adhered to the surface thereof cracks and is otherwise disrupted.

The tubing or tubular food casings suitable for use in preparing shirred and compressed tubular casing of the present invention may be flexible, seamless tubing formed of regenerated cellulose, cellulose ethers such as the ethyl, propyl, hydroxy, alkyl and like ethers, proteins, carbohydrates, collagens, alginates, starches as well as other synthetic or artifical materials. Tubings reinforced with fibers such as, for example, those employed in the production of yoshino paper, rice paper and the like, hemp, rayon, flax, nylon, polyethylene terephthalate and the like are most advantageously employed in applications requiring large diameter tubular food casings.

The tubular casings can be made by any known process such as, for example, by the cuprammonium, deacetylation of cellulose acelate, viscose, denitration of cellulose nitrate processes or extrusion of appropriate compositions. Tubular casings reinforced with fibers can be made by the method and apparatus described, for example, in U.S. Pat. Nos. 2,105,773; 2,144,889; 2,910,380; 3,135,613; and 3,433,633.

Coating materials suitable for use as barrier coatings with tubular food casings are well known and may be prepared, for example, from polyvinylidene chloride resin copolymers, polyethylene and other polyolefin resins, polyester resins, nylon, polyurethane resins and suitable combinations thereof. The barrier coating may be applied to the exterior or interior surfaces of the casing or to both surfaces. The use and type of a primer on the surface of casing employed prior to application of the barrier coating or applying the coating directly to the surface of the casing will depend on the type of coating to be employed, the degree of adhesion required and the service requirements for the casing. It is known, for example, that various cationic thermosetting resins are advantageously employed as primers for enhancing adhesion of certain polyvinylidene chloride copolymer coatings to cellulosic casing surfaces. Exemplary of polyvinylidene chloride copolymer resins barrier coatings advantageously employed with tubular food casings and the method of application, may be found, for example, in the disclosures of U.S. Pat. Nos. 2,961,323; 3,328,330 and 3,369,911.

It is essential to the preparation of the shirred and compressed casings of the present invention that the barrier coating applied to the surface of a tubular casing to be shirred exhibits extensibility characteristics of at least about 4% at 32°F. It has been found, however, that many coating compositions that are used advantageously as barrier coatings for fibrous food casings do not exhibit the extensibility characteristics found to be essential for the mechanical shirring of the tubular casing. Modification of the coating compositions, however, may be possible to obtain the required extensibility characteristics. For example, the extensibility characteristics of polyvinylidene chloride copolymer barrier coatings prepared from commercially available formulations are generally too low upon aging but these commercial formulations may be modified to give the desired extensibility characteristics by incorporation in the coating formulation any one of a number of known ester type plasticizers. Exemplary of suitable plasticizers are the adipates such as di-isobutyl adipate, sebacates such as dibutyl sebacate and phosphate esters such as 2-ethyl hexyl diphenyl phosphate.

Barrier coated tubular casings of the present invention may be prepared from tubular food casings made by well known, conventional methods which are then coated on either the interior or exterior surfaces of the casing using methods well known in the art. For example, the interior surface of the tubular casing may be coated using the well known "slugging" technique described, for example, in U.S. Pat. No. 3,378,379. Alternatively, the tubular casing may be coated on the exterior surface in the manner described, for example, in U.S. Pat. Nos. 2,961,323 or 3,369,911 and, if desired, the coated casing may also be turned inside out.

In general, final processing of the barrier coating usually requires a drying and curing step to promote adhesion between the coating and the casing whereby the moisture content of the coated tubular casing is greatly reduced, the resulting casing having a moisture content less then about 2% by weight.

Another characteristic found to be essential in the preparation of the shirred and compressed casings of the present invention from barrier coated tubular casings is the moisture content of the tubular casing. The moisture content of the tubular casing must be at least about 10% by weight and preferably between about 14 and 28% in order that it may be mechanically shirred without damage thereto.

The desired moisture content of the barrier coated tubular casing may be attained by any of a number of well known methods such as the "slugging" technique, by steam or vapor humidification in an inflated or collapsed condition, or by internal or external spraying of inflated casing depending on whether the barrier coating is on the internal or external surface of the tubular casing.

Shirred and compressed barrier coated tubular casing of the present invention may be prepared by shirring and compressing barrier coated tubular casing having the moisture content and coating extensibility characteristics herein disclosed employing the conventional shirring machines and methods as disclosed, for example, in U.S. Pat. Nos. 2,984,574 and 3,397,069.

The invention is further illustrated by the following examples. Unless otherwise indicated, all parts and percentages are by weight.

EXAMPLE 1

A substantial quantity of fibrous food casing about 2 inches in diameter was prepared using conventional methods and the casing was coated on the exterior surface thereof with a polyvinylidene chloride copolymer coating composition purchased under the trademark "Daran 220" from W. R. Grace & Company. The coating was applied using conventional techniques as for example described in U.S. Pat. No. 2,961,323.

The extensibility characteristics of the coating material was determined to be about 7% and the moisture content of the coated casing was about 2% by weight.

55 foot sample lengths of coated casing were treated with various levels of water by the "slugging" technique and the lengths of moisturized, barrier coated tubular fibrous casing were then shirred and compressed on a standard shirring machine. The shirred and compressed samples of barrier coated casing were subjected to water burst pressure testing to evaluate the extent of damage, if any, resulting from the shirring operation.

Summarized in Table I below are comparative test results obtained from a number of shirred samples having various levels of moisture content.

TABLE I

| Moisture Content (%) | Pinholes (per 55 foot casing) |
| --- | --- |
| 5.9% | 30 |
| 10.8% | 3.5 |
| 11.4% | 1.2 |
| 11.9% | 0.5 |
| 14.6% | 0 |
| 14.7% | 0 |

The number of pinholes in the casing were determined by the water burst pressure test and the test data is an average of 10 samples. The results in Table I above clearly point out the importance of the moisture content of the casing during shirring.

EXAMPLE 2

The tubular fibrous casing and polyvinylidene chloride copolymer resin coating material of Example 1 were used in this Example.

A substantial length of tubular casing was coated using standard procedures with the polyvinylidene chloride copolymer resin coating. The coating fibrous casing was then treated with water by the "slugging" technique to obtain casing with a moisture content of about 14% by weight.

The extensibility characteristics of the coating material is known to change with aging and in order to evaluate the relationship of coating extensibility characteristics and shirring damage, various samples of the coated tubular casing were aged at 65°C. for varying periods of time to accelerate the coating extensibility change. Coating extensibility and shirring tests were run on the aged samples to correlate coating extensibility and coating damage due to shirring.

The results of the coating damage and extensibility testing are summarized in Table II below.

TABLE II

| Coating Extensibility (% at 32°F.) | Coating Shirring Damage (disruptions per foot of casing) |
|---|---|
| 1.5 | greater than 50 |
| 3.0 | 25 to 30 |
| 3.6 | 20 |
| 4.2 | 1 crack in 55 feet |
| 5.0 | 1 crack per carton |
| 7.5 | none |
| 15.0 | none |

Coating extensibility and continuity were determined using the following procedure:

a. one end of a 24 inch length of tubular casing is tied.

b. the initial continuity of the coating is determined to confirm that no discontinuity exists by immersing the coated surface in a cellulose marking ink solution for 5 minutes and then washing the ink from the coated surface. The ink will not adhere to the coating but will diffuse through any disruption in continuity and permanently dye the tubular casing.

c. the casing is then soaked in water at room temperature for ½ hour.

d. the wet casing is placed in a slush ice for ½ hour and the flat width of the casing is measured.

e. the casing is filled with slush ice and attached to a filling, pressure vessel.

f. the circumference is measured while pressure is being applied to the casing.

g. expansion of the casing is stopped when a desired circumference is attained.

h. Coating continuity is then determined on the expanded sample.

Coating extensibility is calculated as follows:

$$\% \text{ extensibility} = 100 \times \frac{[\text{stretched circumference (step } g)] - [2 \times \text{wet flat width (step } d)]}{2 \times \text{wet flat width (step } d)}$$

The data reported in Table II above clearly points out the criticality of coating extensibility as related to coating damage due to shirring.

EXAMPLE 3

An unsupported tubular cellulosic casing was extruded and treated using standard, well known procedures. The tubular casing was then coated with the coating of Example 1 and the coated tubular casing was humidified to a moisture content of 14.5%. The coating extensibility was about 7%. Ten 55 foot lengths of coated, humidified tubular cellulosic casing were shirred and compressed on a conventional shirring machine. Each of the 10 lengths of shirred coated casing were evaluated for pinholes and casing burst pressure. There were no pinholes found in any of the 10 lengths of shirred casing and an average of 8 psi burst pressure was obtained, which is comparable to the burst pressure of conventional unshirred, unsupported tubing.

EXAMPLE 4

Eight samples of 55 foot lengths of shirred, barrier coated fibrous casing were prepared from the casing and coating of Example 1 along with 8 flattened, unshirred samples of the same coated fibrous casing. The moisture content of the casing was between 17 and 22% and coating extensibility was about 7%. Each of the samples of shirred and flattened, unshirred unblurred coated fibrous casing were stuffed with liver sausage emulsion and processed using standard commercial methods. No casing breakage was encountered during the stuffing operation. The processed liver sausages were stored in a cooler at 40° to 45°F. and weight loss and sausage product discoloration was evaluated over a length of time. The storage test data indicated that no significant differences as to weight loss or product discoloration were found between the liver sausage products processed in the shirred and unshirred coated casings.

EXAMPLE 5

The coated and humidified casing of Example 1 was turned inside out and then shirred. The shirred casing sample was treated for water burst properties and coating continuity and no damage was found in either the cellulosic casing or in the coating.

I claim:

1. A shirred and compressed length of tubular cellulosic food casing comprising a tubular cellulosic food casing of extended continuous length that is shirred and compressed into a shortened length thereof, said tubular casing provided with a moisture content of at least about 10% and a continuous moisture and gas impermeable barrier coating adhered to at least one surface thereof, said coated casing also provided with an extensibility characteristic measured at 32°F. of at least 4%, said shirred tubular food casing being suitable for use in the processing and storage of food products where loss of moisture therefrom and oxidation thereof is to be prevented.

2. The shirred casing of claim 1 having a fibrous web embedded in the wall thereof.

3. The shirred casing of claim 2 wherein the tubular casing has a moisture content between about 14 and 28% by weight.

4. The shirred casing of claim 1 having a barrier coating on the exterior surface thereof.

5. The shirred casing of claim 1 having a barrier coating on the internal surface thereof.

6. The shirred casing of claim 1 wherein said moisture and gas impermeable barrier coating is a polyvinylidene chloride copolymer resin.

* * * * *

UNITED STATES PATENT OFFICE
CERTIFICATE OF CORRECTION

Patent No. 3,886,979                    Dated June 3, 1975

Inventor(s) J. J. M. Rasmussen

It is certified that error appears in the above-identified patent and that said Letters Patent are hereby corrected as shown below:

Add to References Cited:

United States Patents
| | | | |
|---|---|---|---|
| 2,961,323 | 11/1960 | Underwood et al | 117/94x |
| 3,097,393 | 7/1963 | Matecki | 17/49 |
| 3,378,379 | 4/1968 | Shiner et al | 117/95 |
| 3,657,769 | 4/1972 | Martinek | 17/42 |

Column 3, line 43, "then" should read -- than --.

Column 6, line 26, "treated" should read -- tested --.

Signed and Sealed this sixteenth Day of March 1976

[SEAL]

Attest:

RUTH C. MASON
*Attesting Officer*

C. MARSHALL DANN
*Commissioner of Patents and Trademarks*